A. C. PURDY.
CLOTHES LINE PULLEY.
APPLICATION FILED AUG. 25, 1913.
1,185,535.
Patented May 30, 1916.
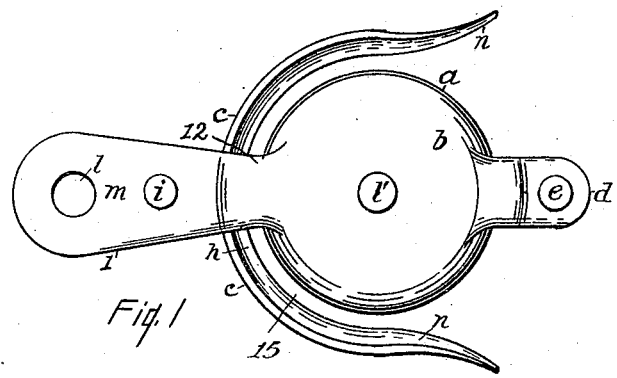
Fig. 1
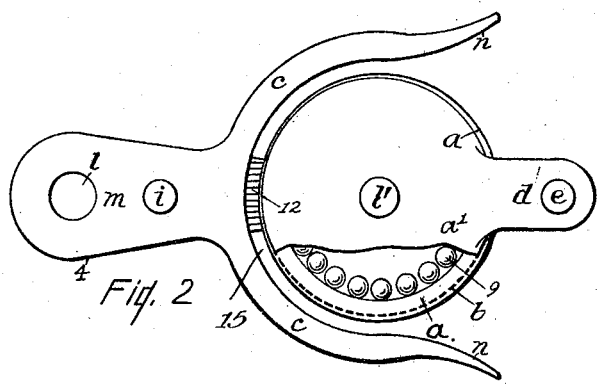
Fig. 2
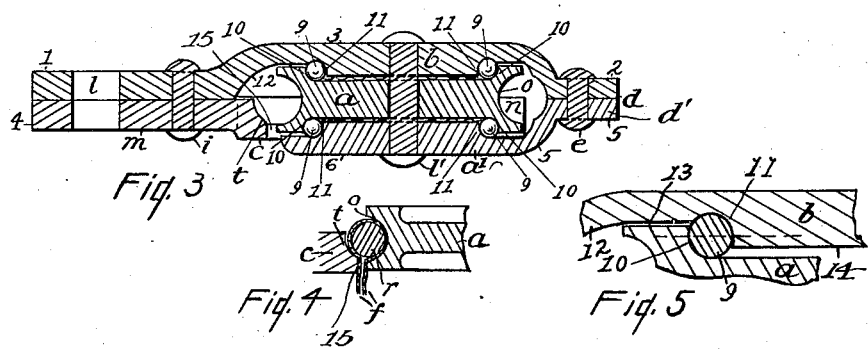
Fig. 3
Fig. 4
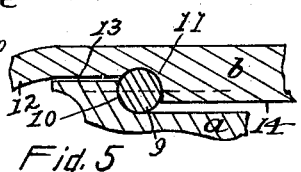
Fig. 5
WITNESSES:
William F. Chase.
Douglas F. Anderson.
INVENTOR
Amos C. Purdy
BY
ATTORNEY

UNITED STATES PATENT OFFICE.

AMOS C. PURDY, OF PEEKSKILL, NEW YORK.

CLOTHES-LINE PULLEY.

1,185,535.  Specification of Letters Patent.  Patented May 30, 1916.

Application filed August 25, 1913. Serial No. 786,476.

*To all whom it may concern:*

Be it known that I, AMOS C. PURDY, a citizen of the United States, residing at Peekskill, in the county of Westchester and State of New York, have invented a new and useful Improvement in Clothes-Line Pulleys, of which the following is a specification.

This invention relates to supports for clothes lines, and its object is the provision of a pulley that will admit of clothes on the line being carried around the pulley with less difficulty than has been possible in such devices.

The object is attained by the means set forth in the specification and the accompanying drawings, in which like letters and numerals refer to similar parts throughout the several views.

Figure 1 is a plan of the pulley viewed from the top. Fig. 2 is a plan of the pulley viewed from the bottom. Fig. 3 is a vertical transverse section of the pulley. Fig. 4 illustrates how clothes on the line are supported while traversing the pulley. Fig. 5 is an enlarged detail of the ball bearing of the pulley.

Fig. 3 illustrates the construction of the pulley in detail. A top plate $b$, as in Fig. 1, comprises a disk having an arm $m$, and diametrically opposite the arm a projection $d$, the arm and the projection as shown in Fig. 3, lying horizontally in a plane below the disk. A bottom plate $a^1$ is, as shown in Fig. 2, a disk with a projection $d'$, both corresponding with the top plate $a$ except as to the arm $m$. These two plates are secured together by the rivets $e$ through the extensions. The disks are centrally perforated for a pin $l'$. The pin holds the disks centrally one opposite the other, and also serves as a pivot for a grooved pulley $a$. The pulley is chambered upon both sides, as in Figs. 3, 4, and 5, and is provided with raceways 10 for balls 9. The top and bottom disks are also provided with raceways 11 for balls. In Fig. 2 the disk $a^1$ is shown as cut away to reveal the balls upon one side of the pulley.

The ball raceways in the pulley are made in a manner to keep the balls within them to prevent the balls from becoming a means of spreading the disks away from the pulley, as the pulley is at times subjected to considerable strain and the balls might be forced between the rim of the pulley and the disks. Fig. 5 shows the raceways upon an enlarged scale so constructed for the said purpose. The broken line $w$ represents the line of the center of the balls, and the side faces 13 of the pulley, and the inner faces 14 of the disks are shown to lie outside of the ball centers. The greater the pressure upon the pulley rim the more forcibly will the wheel retain a hold upon the balls, as the pulley has a hooking projection over the balls.

The arm comprises two parts, the part 1, Figs. 1 and 3 being an extension from the disk $b$, and the part 4, Figs. 2 and 3, with its branching arms $c$ $c$, Figs. 1 2 3 4. The part 4 is secured to the part 1 by a rivet $i$, and the arm is provided with a hole $l$ for attaching the pulley to a support. The arms $c$ $c$ are extended concentrically with the pulley $a$ and the disks $b$, $a^1$, to points diametrically opposite the center rod of the pulley, from where they diverge outwardly into curving points $n$ $n$. A space is left between these arms and the grooved pulley, as at 15, Figs. 1, 2, 3, and 4. The faces of the arms $c$ $c$ that confront the pulley are curved as at $t$ to oppositely conform to the groove in the pulley as in Figs. 1, 3, and 4. The object of this curve is particularly shown in Fig. 4, in which $r$ represents a clothes line in cross-section, and $f$ a fabric suspended from the line. Clothes line pulleys are made with guiding arms as $c$, but the fabrics clog in the groove. The curved arm affords a support to the outer portion or side of the line with the clinging fabric, so that the line moves as freely with a suspended fabric as without it. This outer support for the line, with the ball-bearing pulley constitute the main features of this invention. Without the balls the outer support loses some of its advantages because the pulley turns hard upon its pivot $l'$.

Having described my invention, what I claim and desire to secure by Letters Patent, is—

In a clothes line pulley the combination with a grooved pulley of a frame comprising opposite disks, an extension on the disks by which the disks are secured together, a grooved pulley between the said disks, a pivot through the center of the pulley and secured centrally in the inclosing disks, an arm on the upper disk and arms attached to the said arm to extend partly around the pulley to form a groove or space around the pulley, the arms curved upon their inner faces next the pulley to support a line against the pulley.

Signed at Peekskill, in the county of Westchester and State of New York, this 19th day of August, 1913.

AMOS C. PURDY.

Witnesses:
 E. P. GRISWOLD,
 H. L. BARGER.

Copies of this patent may be obtained for five cents each, by addressing the "Commissioner of Patents, Washington, D. C."